United States Patent
Rune et al.

(10) Patent No.: US 11,483,751 B2
(45) Date of Patent: Oct. 25, 2022

(54) METHOD FOR EVALUATING CELL QUALITY OF CELLS USING BEAMFORMING

(71) Applicant: TELEFONAKTIEBOLAGET LM ERICSSON (PUBL), Stockholm (SE)

(72) Inventors: Johan Rune, Lidingö (SE); Icaro L. J. Da Silva, Solna (SE); Wei Shen, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 234 days.

(21) Appl. No.: 16/639,916

(22) PCT Filed: Aug. 17, 2018

(86) PCT No.: PCT/IB2018/056245
§ 371 (c)(1),
(2) Date: Feb. 18, 2020

(87) PCT Pub. No.: WO2019/035092
PCT Pub. Date: Feb. 21, 2019

(65) Prior Publication Data
US 2020/0245213 A1    Jul. 30, 2020

Related U.S. Application Data

(60) Provisional application No. 62/581,407, filed on Nov. 3, 2017, provisional application No. 62/547,637, filed on Aug. 18, 2017.

(51) Int. Cl.
H04W 36/30 (2009.01)
H04B 7/06 (2006.01)
(Continued)

(52) U.S. Cl.
CPC .......... *H04W 36/30* (2013.01); *H04B 7/0617* (2013.01); *H04W 36/0094* (2013.01);
(Continued)

(58) Field of Classification Search
None
See application file for complete search history.

(56) References Cited

U.S. PATENT DOCUMENTS

2016/0262077 A1* 9/2016 Zhang .................. H04W 24/10
2017/0034730 A1* 2/2017 Zhang .............. H04W 36/0085
(Continued)

FOREIGN PATENT DOCUMENTS

DE    69938475 T2 *  7/2009  .......... G01S 13/426

OTHER PUBLICATIONS

MediaTek Inc., Cell Selection and Reselection in NR, 3GPP TSG RAN WG2 Meeting #98, R2-1704530, Hangzhou, China, May 15-19, 2017 (Year: 2017).*
(Continued)

*Primary Examiner* — Ajit Patel
*Assistant Examiner* — Liem H. Nguyen

(57) ABSTRACT

A method for evaluating cell quality includes obtaining cell quality information and determining, based on the cell quality information, a first number, X, of beams whose qualities are above a threshold, T, for a first cell and a second number, Y, of beams whose qualities are above the threshold, T, for a second cell. The method includes complementing a third number, M, of fictive beams to offset a difference between the first number, X, of beams and the second number, Y, of beams, and measuring a first average beam quality, $Q_1$, for the first cell and a second average beam quality, $Q_2$, for the second cell. The method may include a
(Continued)

certain number fictive beams with assigned beam quality when calculating cell qualities for cells which are included in comparison.

26 Claims, 14 Drawing Sheets

(51) Int. Cl.
*H04W 36/00* (2009.01)
*H04W 36/08* (2009.01)
*H04W 48/20* (2009.01)
*H04W 56/00* (2009.01)

(52) U.S. Cl.
CPC ............ *H04W 36/08* (2013.01); *H04W 48/20* (2013.01); *H04W 56/001* (2013.01)

(56) References Cited

U.S. PATENT DOCUMENTS

| | | | |
|---|---|---|---|
| 2017/0295537 A1* | 10/2017 | Wang | H04W 48/20 |
| 2017/0367120 A1* | 12/2017 | Murray | H04W 72/046 |
| 2018/0007577 A1* | 1/2018 | Guo | H04W 48/16 |
| 2018/0324687 A1* | 11/2018 | Chen | H04B 7/0408 |
| 2019/0319686 A1* | 10/2019 | Chen, IV | H04B 7/088 |
| 2020/0014474 A1* | 1/2020 | Khirallah | H04B 7/0695 |
| 2020/0169896 A1* | 5/2020 | Li | H04W 48/16 |
| 2020/0383014 A1* | 12/2020 | Chen | H04L 5/0051 |

OTHER PUBLICATIONS

Mediatek Inc., Cell Selection and Reselection in NR, R2-1703013, 3GPP TSG-RAN WG2 Meeting #97bis, Spokane, WA, USA, Apr. 3-7, 2017.

Ericsson, Cell quality derivation for idle/inactive UEs, Tdoc R2-1804718 (Resubmission of R2-1802331), 3GPP TSG-RAN WG2 #101 bis, Sanya, China, Apr. 16-20, 2018.

Ericsson, Cell quality derivation for idle/inactive UEs, Tdoc R2-1700345, 3GPP TSG-RAN WG2 NR AH#3, Vancouver, Canada, Jan. 22-26, 2018.

Ericsson, Cell quality derivation for idle/inactive UEs, Tdoc R2-1712338 (revision of R2-1710444), 3GPP TSG-RAN WG2 #100, Reno, Nevada, Nov. 27-Dec. 1, 2017.

* cited by examiner

METHOD FOR EVALUATING CELL QUALITY OF CELLS USING BEAMFORMING

This application is a 371 of International Application No. PCT/IB2018/056245, filed Aug. 17, 2018, which claims the benefit of U.S. Application No. 62/547,637, filed Aug. 18, 2017, and claims the benefit of U.S. Application No. 62/581,407, filed Nov. 3, 2017, the disclosures of which are fully incorporated herein by reference.

TECHNICAL FIELD

Particular embodiments relate to the field of evaluating cell quality; and more specifically, to methods, apparatus and systems for evaluating cell quality based on beams which are taken into the evaluation in the 5G generation radio.

BACKGROUND

The 5G system is currently being standardized by 3GPP, where the radio access network may be referred to as New Radio (NR) and the core network may be referred to as Next Generation Core (NGC). The 5G system will often be deployed in conditions, where achieving an appropriate coverage may be challenging, such as a cell edge coverage. This is especially the case when high carrier frequencies are utilized, for example, when carrier frequencies are above 6 GHz.

A method of combating the low signal-to-noise ratio (SNR) and/or signal to interference and noise ratio (SINR) a user equipment (UE) can experience at the coverage edge may be to use a high-gain beamforming, i.e. directing the radiated energy in a narrow beam against the intended receiver. For signals that are broadcast in a cell, a beam sweep has to be used to cover the entire cell, i.e. transmitting the signal in one beam direction after the other until the entire cell area has been covered. One use of such signals is to provide opportunities for UEs to measure on the signal quality to assess the quality of the cell and the cell's usefulness for communication and/or camping.

In RRC_IDLE or RRC_INACTIVE state, a UE in NR measures on a signal package which is referred to as a Synchronization Signal (SS) Block to assess the quality of a cell and its usefulness for camping. Camping may be referred to monitoring certain downlink signals, such as a paging channel. An SS Block consists of at least two time-division multiplexed components: Primary Synchronization Signal (PSS) and Secondary Synchronization Signal (SSS). The combination of PSS and SSS is transmitted together with a broadcast channel denoted PBCH, which carries a small part of the system information. The system information is sometimes referred to as the Master Information Block (MIB). The structure of PSS and SSS and PBCH is denoted SS Block. The SS Block is broadcast in a cell to provide crucial information for UEs, e.g. UEs in RRC_IDLE or RRC_INACTIVE state.

SS Block transmissions may be grouped into a SS Burst. The SS Block transmissions in the SS Burst may be the SS Block transmissions of a beam sweep, in the case where transmission of multiple beamformed SS Block transmissions to reach the entire cell coverage area. Each SS Block transmissions covers a different part of the cell coverage area.

From an RRC_IDLE or RRC_INACTIVE UE perspective in the cell re-selection procedure, a camping UE typically needs to periodically perform beam measurement and evaluation of the serving cell, namely intra-cell measurement and evaluation. Besides, the UE also needs to periodically perform beam measurement and evaluation on both the serving cell and non-serving cells, namely inter-cell measurement and evaluation.

According to the 3GPP agreement from the RAN2 NR Ad Hoc meeting in Qingdao in June 2017, an RRC_CONNECTED UE should derive the cell quality by averaging the best beam with the up to N−1 best beams above absolute configured threshold.

For RRC_IDLE and/or RRC_INACTIVE UEs, only a few high-level agreements were made, including that the UE camps on the best NR cell, the UE performs cell selection and cell re-selection on NR cells, and the UE performs cell selection and cell re-selection on NR cells, having the LTE mechanism as baseline.

Regarding the subject of cell quality derivation in RRC_IDLE/RRC_INACTIVE, the following agreement has been made in the RAN2 Ad Hoc meeting in Spokane in January 2017, including that in multi-beam operations, measurement quantity of a cell is derived amongst the beams corresponding to the same cell.

Furthermore, in the RAN2 #97 meeting in Athens in February 2017, the following agreement has been made. As for a cell re-selection, cell quality can be derived from N best beams, where N refer a number of best beam and the value of N can be configured to 1 or more than 1.

To summarize, for a cell re-selection, the following may be concluded, or assumed. A UE in RRC_IDLE or RRC_INACTIVE state derives the cell quality for the purpose of cell re-selection assessment through averaging in the linear domain from the N best beams whose qualities exceed an absolute threshold. The value of N can be configured to 1 or more than 1 and the threshold is probably configurable, but at this point it cannot be ruled out that it will be hardcoded, for example, a fixed specified value. This method to derive the cell quality could be used for the intra-cell and inter-cell quality measurement for the cell re-selection assessment.

There currently exist certain challenges. For example, one challenge associated with the current mechanism is that different cells that are considered and evaluated as potential target cells for cell re-selection or the serving cell which the UE may remain in if none of the potential target cells is better may have different numbers of detected beams and/or good beams to be taken into account in the assessment. The detected beams may be referred to the beams whose quality derived exceeds a threshold, and the good beams may be referred to the beams whose quality exceeds the absolute threshold. This may result in unfair comparison between the potential cells.

For instance, the current method penalizes cells with more good beams. This is counterproductive, since the purpose of using N>1 is to favor cells with more good beams, or better second best beams, third best beams, etc. As an example, consider two cells whose respective best beam has the same quality measured as reference signal received power (RSRP) in Watt (W), the best cell quality, $Q_{best}$, equal the quality of the best beam, P, i.e. $Q_{best}$=P W. Assume then that one of the two cells, Cell A, only has a single good beam, wherein only its best beam exceeds the absolute threshold. This results in the average cell quality equals to the quality of the best beam, $Q_{average}$=P W, wherein the averaging is calculated based on the trivial average of a single value. Then assume that the other of the two cells, Cell B, has one more beam exceeding the absolute threshold, with a quality being $Q=0.8\times P$ W, resulting in an average of $Q_{average}=(P+0.8P)/2=0.9$ P W, which hence is lower than the average of Cell A.

A comparison of the beam quality averages of the two cells results in that the first cell, with only a single beam exceeding the absolute threshold, is assessed as the best. This is clearly a suboptimal result, since both cells have equally good best beams, while the second cell in addition has one more good beam.

Another issue with current methods is that when a cell has more than one beam and if some of its beams are close to the configured absolute threshold, the measured cell level RSRP when N>1 could vary between successive measurement samples depending on whether the beams are below or above the absolute threshold. For example, if a cell has three beams and if the RSRP values of the three L1 filtered beams are B11, B12, and B13 Watts in the first-time instance and B21, B22, B23 Watts in the second instance, the measurement cell quality with N=3 and the absolute threshold of T Watts in the two successive time instances will be B11 Watts and ((B21+B22+B23)/3) Watts respectively, when (B12, B13)<T<(B11, B21, B22, B23). This also create an unwanted fast fading kind of effect in the derived cell quality, which does not properly reflect reality, especially if the best beam is significantly above the absolute threshold, e.g. (B11, B21)>>T, while the two other beam measurement results in the second instance are rather close to the absolute threshold. This fast fading-like effect is disadvantageous in both RRC_IDLE and RRC_CONNECTED state, especially in RRC_IDLE state where there is no standardized L3 filtering to nullify, the fast fading effects so created.

The same problem applies to the cell quality derivation for support of RRC_CONNECTED state mobility, i.e. handover, as the cell quality derivation mechanism is similar. The consequence is that measurement reports for N>1 would be triggered earlier if triggered by the cell qualities of cells with fewer beams compared to the case of cells with more beams, which is also counterproductive and may result in suboptimal handover decisions.

SUMMARY

To address the foregoing problems with existing solutions, disclosed is methods, a user equipment (UE), and a communication system for evaluating cell quality fairly and realistically by complementing certain number of fictive beams with an assigned beam quality. The present disclosure implements a solution for evaluating a cell quality for each potential cell adequately and furthermore providing the UE to perform a subsequent action smoothly with a better beam coverage.

Several embodiments are elaborated in this disclosure. According to a first embodiment of a method for evaluating cell quality, the method comprises obtaining cell quality information. The method additionally comprises determining, based on the cell quality information, a first number, X, of beams whose qualities are above a threshold, T, for a first cell and a second number, Y, of beams whose qualities are above the threshold, T, for a second cell. The method further comprises complementing a third number, M, of fictive beams to offset a difference between the first number, X, of beams and the second number, Y, of beams. The method yet further comprises measuring a first average beam quality, $Q_1$, for the first cell and a second average beam quality, $Q_2$, for the second cell.

In one embodiment, the method further comprises obtaining configuration information which includes a maximum number, N, of beams for the first cell and the second cell and a fictive parameter, K. In another embodiment, the third number, M, complements the first number, X, to the maximum number, N, when the second number, Y, equals the maximum number, N. In yet another embodiment, the third number, M, complements the first number, X, to the second number, Y, when the maximum number, N, is greater than both of the first number, X, and the second number, Y, and the second number, Y, is greater than the first number, X.

In one embodiment, each fictive beam has a third beam quality, $P_F$, which is defined based on any combination of the fictive parameter, K, the threshold, T, and a best beam quality, $P_{Best}$, from the first cell when Y is greater than X. In one embodiment, $P_F=K\times T$, where $0<K\leq 1$. In another embodiment, $P_F=K\times P_{Best}$, where $0<K<1$. In another embodiment, $P_F=T+(P_{Best}-T)\times K$, where $0<K<1$. In yet another embodiment, $P_F=T$, $Q_1=(P_{Best}+M\times T)/(1+M)$ and $Q_2=Y\{T+(P_{Best}-T)/2\}/Y$, when the first cell has one beam whose quality is above the threshold, T, and the second cell has Y beams whose qualities are between $P_{Best}$ and T.

In one embodiment, the method is performed at a user equipment (UE) and further comprises sending, to a network node, the measurement of the first average beam quality, $Q_1$, for the first cell and the second average beam quality, $Q_2$, for the second cell. The cell quality information is from measuring SS Blocks of the first cell and the second cell.

In one embodiment, the method is performed at the network node and further comprises sending, to the UE, the measurement of the first average beam quality, $Q_1$, for the first cell and the second average beam quality, $Q_2$, for the second cell.

In one embodiment, the measurement of the first average beam quality, $Q_1$, for the first cell and the second average beam quality, $Q_2$, for the second cell is used for a cell re-selection evaluation or a handover target evaluation.

According to a second embodiment of a method for evaluating cell quality, the method comprises obtaining cell quality information and a maximum number, N, of beams for a cell. The method additionally comprises determining, based on the cell quality information, a first number, X, of beams whose qualities are above a threshold, T, for the cell. The method further comprises complementing a second number, M, of fictive beams to offset a difference between the first number, X, of beams and the maximum number, N, of beams for the cell. The method yet further comprises measuring an average beam quality, Q, for the cell.

In one embodiment, the method further comprises obtaining configuration information which includes a fictive parameter, K. In another embodiment, each fictive beam has a fictive beam quality, $P_F$, which is defined based on any combination of the fictive parameter, K, the threshold, T, and a best beam quality, $P_{Best}$, from the cell. In one embodiment, $P_F=K\times T$, where $0<K\leq 1$. In another embodiment, $P_F=K\times P_{Best}$, where $0<K<1$. In another embodiment, $P_F=T+(P_{Best}-T)\times K$, where $0<K<1$. In yet another embodiment, $P_F=T$, $Q=(P_{Best}+M\times T)/(1+M)$, when the cell has one beam whose quality is above the threshold, T.

Particular embodiments are described for a UE. In one embodiment, a UE for resuming a connection comprises at least one processing circuitry and at least one storage that stores processor-executable instructions, when executed by the processing circuitry, causes the user equipment to obtain cell quality information and to determine, based on the cell quality information, a first number, X, of beams whose qualities are above a threshold, T, for a first cell and a second number, Y, of beams whose qualities are above the threshold, T, for a second cell. The instructions cause the user equipment to complement a third number, M, of fictive beams to offset a difference between the first number of beams and the second number of beams and to measure a first average beam quality, $Q_1$, for the first cell and a second average beam quality, $Q_2$, for the second cell.

In one embodiment, the user equipment obtains the cell quality information from measuring SS Blocks of the first cell and the second cell respectively. The UE may perform a cell re-selection or a handover based on the measurement of the first average beam quality, $Q_1$, for the first cell and the second average beam quality, $Q_2$, for the second cell In another embodiment, a communication system for resuming a connection comprises a user equipment and a network node. The user equipment comprises at least one processing circuitry configured to obtain cell quality information and to determine, based on the cell quality information, a first number, X, of beams whose qualities are above a threshold, T, for a first cell and a second number, Y, of beams whose qualities are above the threshold, T, for a second cell. The at least one processing circuitry is also configured to complement a third number, M, of fictive beams to offset a difference between the first number of beams and the second number of beams; to measure a first average beam quality, $Q_1$, for the first cell and a second average beam quality, $Q_2$, for the second cell; and to send, to the network node, the measurement of the first average beam quality, $Q_1$, for the first cell and the second average beam quality, $Q_2$, for the second cell.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may offer a beneficial evaluation of cell quality for each potential cell by complementing a certain number of fictive beams with adequate beam quality. With these methods, the UE may conduct a better, continuous transmission, such as a selection of a target cell or a handover, due to a better beam coverage from an optimized evaluation of cell quality.

The present embodiments offer a much realistic calculation of cell quality may further optimize the operation for the UE and the network node efficiently. The present embodiments prevent the UE from operating on a poor cell, in the case such operation may be triggered by a cell having fewer good beams.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
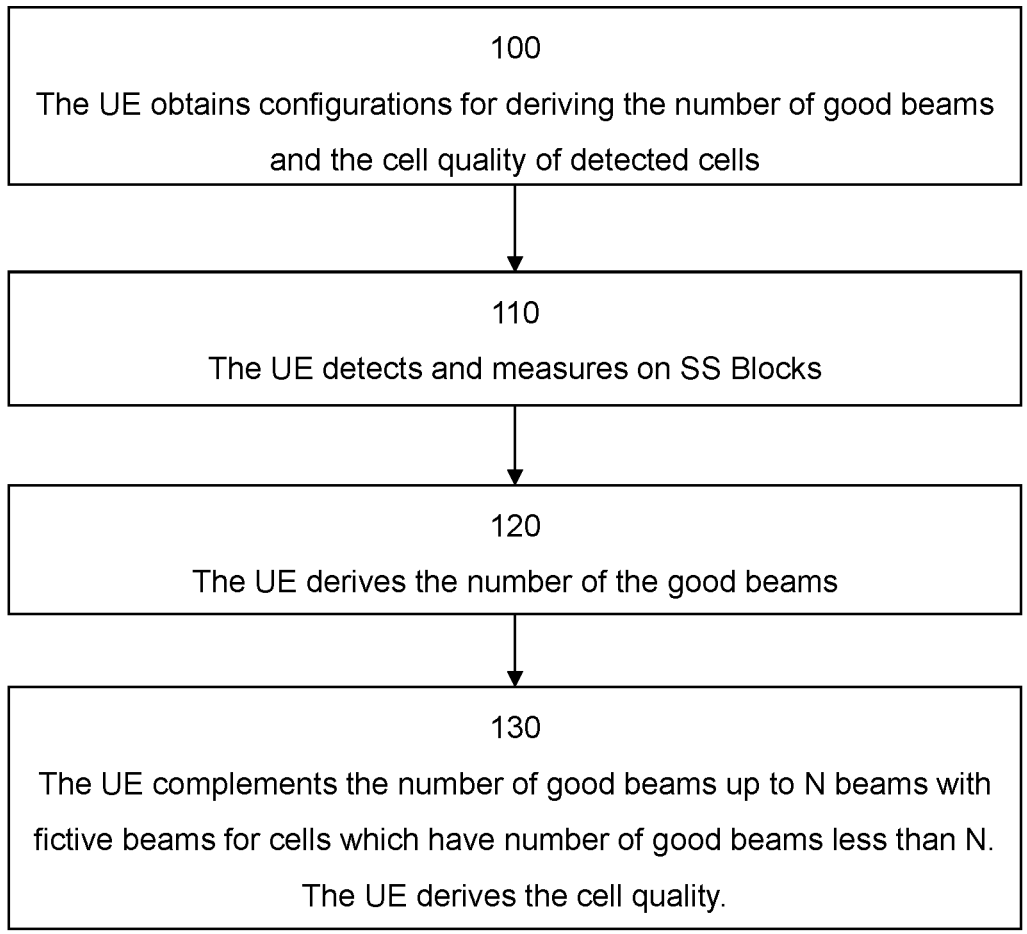
FIG. 1 illustrates a flow diagram of an example method performed at a user equipment, in accordance with certain embodiments.

In light of the unfair evaluation of cell quality caused by uneven numbers of good beams from cells in comparison, particular embodiments of the present disclosure propose a method to provide a certain number of fictive beam to offset the difference of good beams from different cells in comparison, so that for each cell, the number of beams which are taken into account from each cell is the same. In the present disclosure, the good beam may refer to a beam whose beam quality is greater than a threshold. In some embodiments, the threshold may be a configured absolute threshold. The good beams may also refer to those beams whose respective quality exceeds the absolute threshold and hence are qualified to be part of the averaging for cell quality derivation.

After complementing different numbers of beams for the cell which has less good beams, particular embodiments of the present disclosure may further assign a proper fictive beam quality for each fictive beam when calculating a cell quality for the cell with the fictive beams. In particular embodiments, the fictive beam quality may be close to the threshold in order to alleviate the impact on the calculation of cell quality from one single good beam which may be significantly above the threshold. This solution enables a fair comparison between cells having different numbers of good beams.

The present disclosure harmonizes the numbers of beams used in the averaging for a cell quality derivation in all the cells being compared with each other, by introducing fictive beams to complement the good beams, if needed, to get M beams to include in the averaging, in which M is the number of difference in good beams between two cells in comparison. The fictive beams are assigned a fixed quality at or below the absolute threshold. In some embodiments, the fictive beams may be assigned a fixed quality slightly below the threshold. This is motivated by the fact that it is reasonable that it should not be a disadvantage for a cell to have one more beam above the absolute threshold than another cell. In some embodiments, the fictive beams may be used to complement the good beams up to a smaller number than N, if none of the cells to be compared for cell re-selection evaluation or for handover target evaluation has N good beams, in which N is a configured maximum number of beams to be taken into account in the cell quality derivation. Certain embodiments may allow for the fair comparison between cells having different numbers of good beams.

Certain aspects of the present disclosure and their embodiments may provide solutions to these or other challenges. For example, certain embodiments provide a way to complement the good beams with fictive beams up to N beams in total, where the fictive beams are assigned a fixed quality at or below the absolute threshold. In some embodiments, the fictive beams may be assigned a fixed quality slightly below. In some embodiments, the fictive beams of a cell may be assigned a quality in relation to the best beam of the cell.

There are, proposed herein, various embodiments which address one or more of the issues disclosed herein. For example, according to certain embodiments, a method performed by a wireless device for comparing beams comprises obtaining configuration information comprising a threshold. The method further includes detecting a first number of beams associated with a first cell. The first number of beams comprises X beams having a beam quality that exceeds the threshold. The method additionally includes detecting a second number of beams associated with a second cell. The second number of beams comprising Y beams having a beam quality that exceeds the threshold. The method further includes determining a first average beam value for the first cell. The first average beam value is based on the X beams and at least one fictive beam. The method additionally includes determining a second average beam value for the second cell. The second average beam value is based on at least the Y beams.

In some embodiments, the method also includes selecting the cell having the better average beam value. In certain embodiments, the configuration information further comprises a maximum number, N, of beams. In particular embodiments, the first cell may comprise the X beams and L fictive beams, wherein X plus L is less than the maximum number, N, of beams, and the first average beam value is based on the X beams and L fictive beams. In certain embodiments, the second cell comprise the Y beams comprise R fictive beams, wherein Y plus R is less than the maximum number, N, of beams, and the second average beam value is based on the Y beams and the R fictive beams. In some embodiments the first cell may comprise the X beams and L fictive beams, wherein L is less than Y beams, and the first average beam value is based on the X beams and the L fictive beams. In certain embodiments, the method further includes detecting and measuring the SS block associated with the first number of beams and the second number of beams. In some embodiments, the fictive beam has a quality less than the threshold.

Consider two cells whose respective best beam has the same quality measured as RSRP in Watt, i.e. $Q_{best}$=P W. Assume then that one of the two cells, Cell A, only has a single good beam (i.e. only its best beam exceeds the absolute threshold). This results in average equals to the quality of the best beam, $Q_{average}$=P W, i.e. the trivial average of a single value. Then assume that the other of the two cells, Cell B, has one more beam exceeding the absolute threshold, with a quality being Q=0.8×P W, resulting in an average of $Q_{average}$=(P+0.8P)/2=0.9 P W, which hence is lower than the average of Cell A. However, with the proposed methods disclosed herein, Cell B may a better cell quality than Cell A.

Certain embodiments may also reduce the impact of having certain beams below and above the configured absolute threshold in successive time instances which otherwise results in fast fading like noise in the cell level RRM measurement. If fictive beams are at the same quality level as the threshold, i.e., T Watts, then there are scenarios in which in the first-time instance having fewer good beams, the UE will perceive the cell quality in the first-time instance to be for example ((B11+T+T)/3) Watts and ((B21+B22+B23)/3) Watts in the next time instance, thus reducing the large variations in RSRP between time instances.

On the other hand, using beams below the absolute threshold for a cell with fewer beams above the absolute threshold may disproportionally disfavor this cell, if these additional beams are far below the absolute threshold, possibly even 0 W RSRP. In some embodiments, a beam quality, an absolute threshold and the resulting derived cell quality may be represented by some other measure of the received power or the received power in relation to unwanted signals, such as interference, e.g. RSRQ, SNR or SINR. To get a reasonable slight advantage for cells with more beams above the absolute threshold without overly disfavoring the cells with fewer beams above the absolute threshold, it is therefore proposed to use fictive beams to complement the good beams up to N beams, where the fictive beams have a preconfigured or predefined quality of K×T W, where T is the absolute threshold measured in W and K is a number 0<K≤1, e.g. K=0.95. In some embodiments, the beam quality may be measured in the logarithmic domain, e.g. RSRP measured dBm, then K×T would be transformed into T log-domain+K log-domain dBm, where T log-domain is the absolute threshold measured in dBm and K log-domain is a number representing dBm where K log-domain≤0. In the logarithmic domain, the beam quality may also be measured in dB, e.g. RSRQ, SNR or SINR measured in dB. The value of K, named as the fictive parameter, may be standardized, configured via system information or left as an implementation choice in UEs and/or gNBs.

For instance, if the first cell has N−L beams above the absolute threshold T (where N>L≥0), then, when performing the averaging, the calculation would include L fictive beams with a quality of K×T, where K may be 0.95×T. Optionally, if none of the cells to be compared with each other has N good beams, then the number of beams of the cell with the greatest number of good beams may be used instead of N when complementing with fictive beams. For instance, if the one of the cells to be compared that has the greatest number of good beams has Z good beams (where 0<Z<N), then, when deriving the cell quality for the other cells, these cells could be assumed to have fictive beams complementing the good beams up to Z beams. However, complementing the good beams with fictive beams up to N beams in some circumstances may be preferred as it may be more consistent and the principle, therefore, the derived cell quality is not affected by which cells that are involved in the comparison.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node" is used. It can be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

FIG. 1 is an example method performed at a user equipment, in accordance with certain embodiments. The method starts at step 100 with obtaining configurations for deriving the number of good beams and cell quality of detected cells, e.g. the cells in comparison or a single cell for multiple evaluations in different time instances. In some embodiments, the configurations comprise a fictive parameter, K, and the maximum number of good beams, N. As discussed, the value of the fictive parameter, K, may be standardized, configured via system information, configured via dedicated RRC messaging for connected mode UEs or left as an implementation choice in UEs and/or gNBs. The network configures a UE with the maximum number of best beams, N, for cell quality derivation via system information, or via a dedicated RRC configuration message. In certain embodiments, the network may be a network as described with respect to FIG. 2.

At step 110, the UE detects and measures SS Blocks of each cell in comparison. According to the agreements in 3GPP, the network can configure a UE in RRC_IDLE state with a measurement timing configuration window per frequency carrier. A configured UE may detect and measure the SS Blocks of the serving cell and neighbor cells in that configured window.

At step 120, the UE derives the number of good beams based on the measurement of SS Blocks on each cell. There are several ways to determine whether a detected beam is a good beam, including the beam quality of the detected beam being larger than an absolute threshold, and/or the difference of the beam quality between the detected beam and the best beam being smaller than a relative threshold.

At step 130, the UE derives the cell quality based on the methods disclosed herein. For cells which have a number of good beams less than the maximum number, N, of the good beams, the UE will complement the number up to N beams with fictive beams, so that all detected cells have equal numbers of good beams. Then, the UE will perform the cell quality comparison between those cells. In one embodiments, step 130 may be performed for multiple times for evaluating the cell quality of a single cell in different time instances. For example, in first time instance, the UE determines the maximum number, N, of the good beams and a first number, X, of the good beams for the single cell; complements a second number, M, of fictive beams to offset a difference between the first number, X, of good beams and the maximum number, N, of the good beams for the single cell; and derives the cell quality having the number, N=(X+M), beams being evaluated. In second time instance, the UE determines a third number, Y, of the good beams for the single cell; complements a fourth number, R, of fictive beams to offset a difference between the third number, Y, of good beams and the maximum number, N, of the good beams for the single cell; and derives the cell quality having the number, N=(Y+R), beams being evaluated. In this case, in different time instances, it is ensured that the same number of good beams is considered in each evaluation of cell quality.

The method may be used in conjunction with a cell quality assessment for a cell re-selection evaluation or for a handover target evaluation assuming that the UE reports the respective quality of individual beams. In a case of two cells having different number of good beams, the method may be performed by a UE. While in the other case of successive measurements, the method may be performed by either a gNB or a UE. In addition, the method may be used for an evaluation of whether event trigger conditions are met, such as conditions for triggering measurement reports from a UE to the gNB for supporting RRC_CONNECTED state mobility.

In some embodiments, a slight variation may be used in the way the value is chosen for a fictive beam. Instead of all fictive beams getting the same value and that this value is set in relation to be equal to or slightly lower than the absolute threshold determining which real beams up to N beams that are qualified to be part of the averaging for cell quality derivation.

It is reasonable that the quality of the best beam of a cell is viewed as especially important, since this is the beam that initially will be used if the UE re-selects to the cell or is handed over to the cell. Consider a scenario where cell A has a single really good beam which is the best beam of cell A far above the absolute threshold, e.g. an RSRP value of $P_A$ W, while its other beams are all much worse, even below the absolute threshold. Another Cell B in comparison, on the other hand, has N beams above the absolute threshold, T, all being roughly equally good with a quality midway between the absolute threshold and the quality of cell A's best beam, e.g., an RSRP value $P_B=T+(P_A-T)/2$. If N>2 and the fictive beams are given a quality value, e.g. the RSRP value $P_F$, equal to the threshold, i.e. an fictive RSRP value of $P_F=T$ W, this will result in that the derived average-based cell quality will be worse for cell A than for cell B, despite that the best beam of cell A is significantly better than the best beam of cell B. For example, using plain averaging with the above beam quality values and N=3, then the average RSRP value representing the cell quality of cell B would be $Q_B=3(T+(P_A-T)/2)/3=T+(P_A-T)/2$ W, while the corresponding value for cell A would be $Q_A=(P_A+2P_F)/3=(P_A+2T)/3=T+(P_A-T)/3<Q_B$. Therefore, with fictive beams having a proper assigned quality provided in certain embodiments, the cell quality, $Q_B$, of Cell B having more good beams is better than the cell quality, $Q_A$ of Cell A having one single good beam and more worse beams.

Depending on preferences, e.g. if the quality of the best beam of a cell is viewed as especially important, this may be regarded as an undesirable bias towards favoring a cell with multiple reasonably good beams over a cell with only a single good, but really good, beam. To counteract this bias, the value of a cell's fictive beams may, instead of being set in relation to the absolute threshold, be set in relation to the best beam of the cell. This would result in that different values for the fictive beams may be used in different cells and that a cell with a better best beam will also have better fictive beams than a cell with a worse best beam. Setting fictive beam values in relation to the best beam of a cell may be done in different ways, including using RSRP values in Watts as the quality value, with $P_{Best}$ representing the value of the best beam in a cell and $P_F$ representing the value of any fictive beams in the same cell. In some embodiments, $P_F=c \times P_{Best}$, where c is a constant, $0<c<1$. In the logarithmic domain one would instead subtract a value from the value of the best beam. In some embodiments, $P_F=T+(P_{Best}-T)\times c$, where $0<c<1$. In some embodiments, $P_F=P_{Best}-C$, where C is a constant and preferably $C<P_{Best}$ and possibly $C<T$. In some embodiments, $P_F=T+(P_{Best}-C)\times c$, where $0<c<1$ and $C \geq T$. In some embodiments, $P_F=MAX(P_{Best}-c1, c2 \times T)$, where c1 and c2 are constants and preferably $0<c2 \leq 1$. In some embodiment, $P_F=MAX(T+(P_{Best}-C)\times c, c2 \times T)$, where $0<c<1$ and preferably $0<c2 \leq 1$.

In some embodiments, the quality value of fictive beam may be set dynamically, that is in certain situations the fixed value may be used, while in other scenarios the value based on the best beam may be used. For example, when the gap between the best beam and the second best beam is above a threshold, the fictive beam value is based on the best beam. On the other hand, when the gap between the best beam and the second best beam is below the threshold the fictive beam value is given a fixed value based on the absolute threshold.

Figure 2:
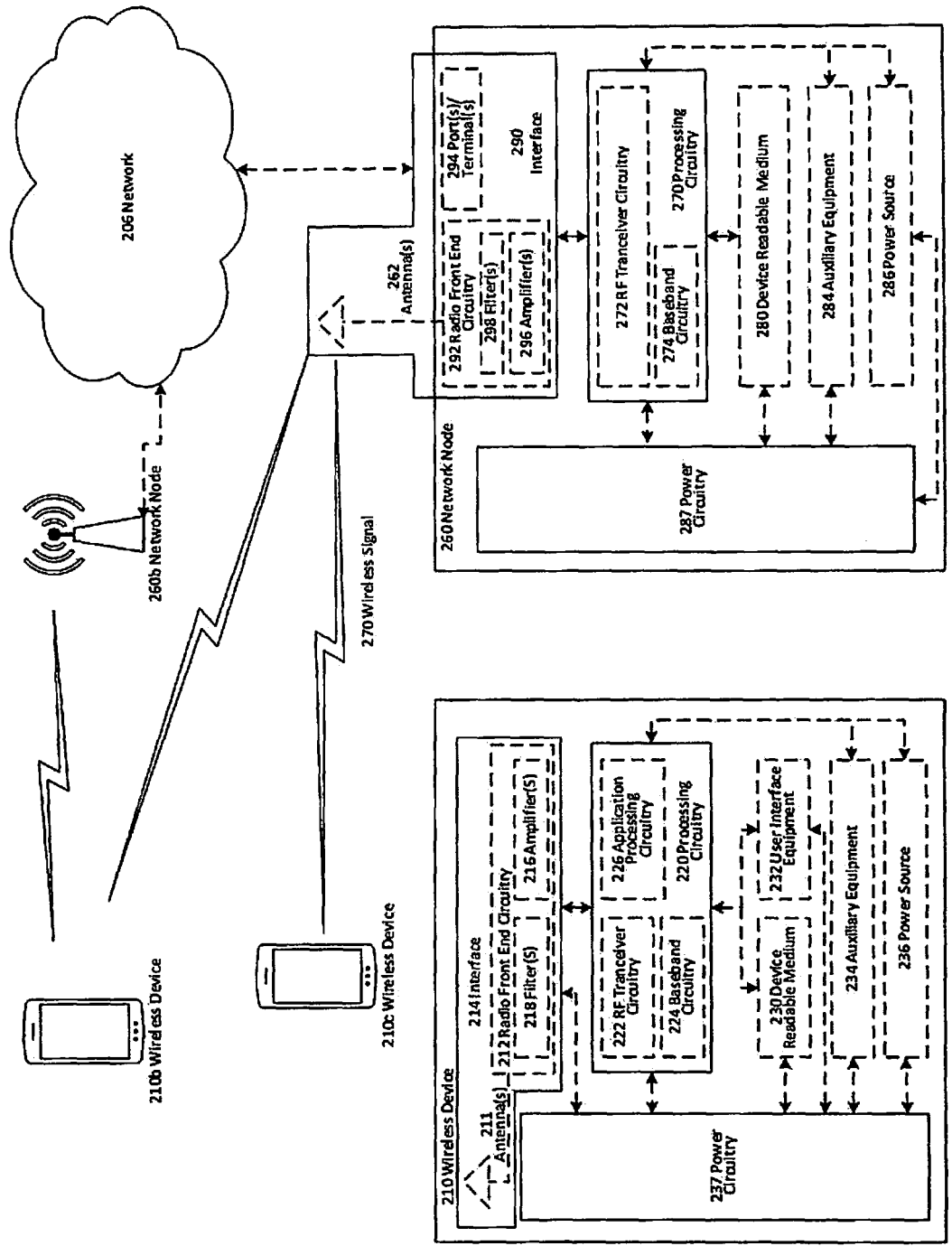
FIG. 2 illustrates an example wireless network, according to certain embodiments.

FIG. 2 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and wireless devices (WDs) 210, 210b, and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. In certain embodiments, the network node 260 may be an apparatus which is further depicted in FIG. 13. In some embodiments, the network node 260 may be a base station, such as gNB. In certain embodiments, the wireless device 210 may be a user equipment, which is further illustrated in FIG. 14. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 288, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination. In particular embodiments, the processing circuitry 270 of the network node 260 may perform the methods, which are further illustrated in FIGS. 11 and 12.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signaling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 210 may be a user equipment which is further depicted in FIGS. 3 and 14. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein. In particular embodiments, the processing circuitry 220 of the wireless device 210 may perform the method which is further illustrated in FIGS. 11 and 12.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionalities described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
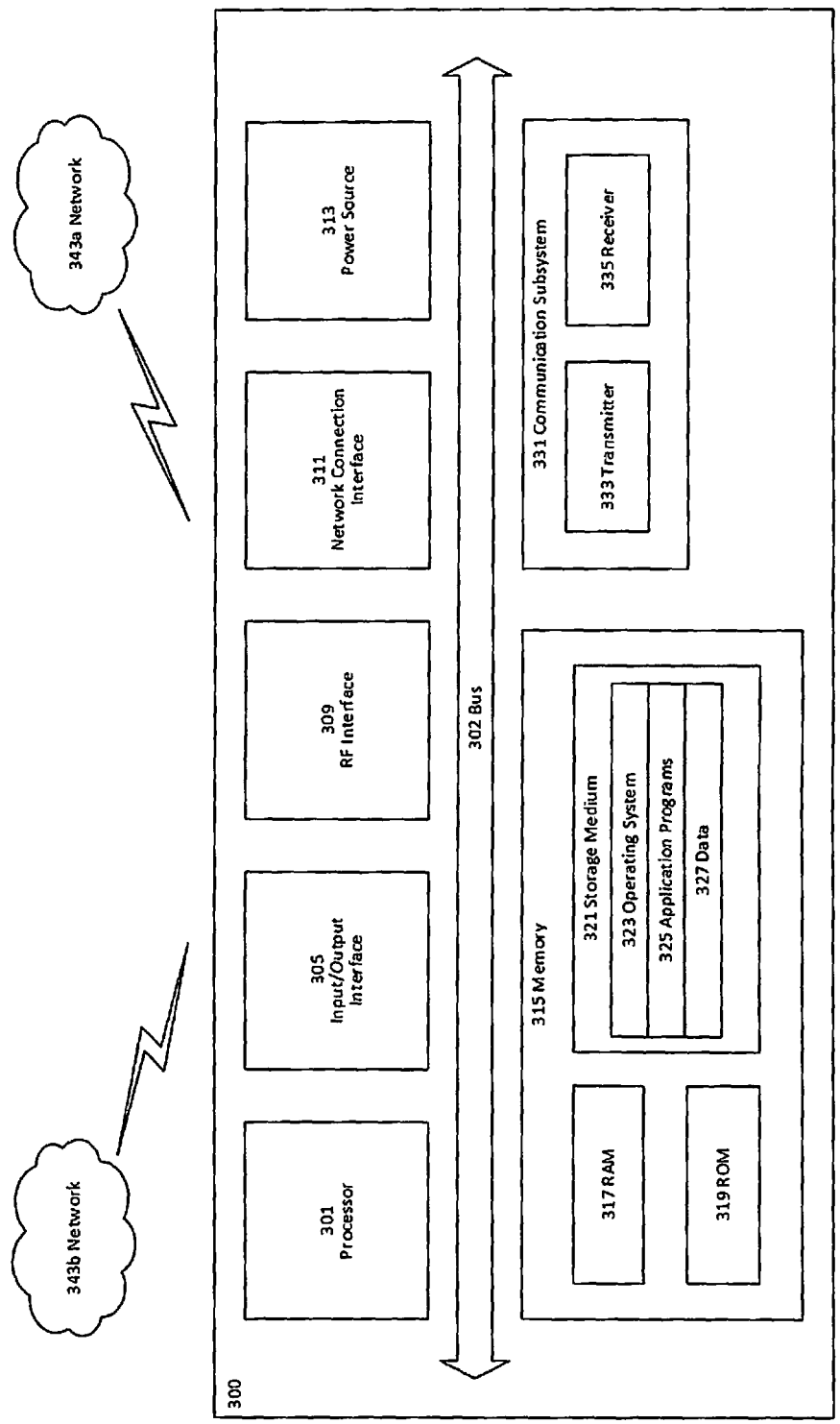
FIG. 3 illustrates an example user equipment, according to certain embodiments.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 300 may be any UE identified by the 3rd Generation Partnership Project (3GPP), including a NB-IoT UE, a MTC UE, and/or an enhanced MTC (eMTC) UE. UE 300, as illustrated in FIG. 3, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 300 may be a user equipment which is further depicted in FIG. 14. As mentioned previously, the term WD and UE may be used interchangeable. Accordingly, although FIG. 3 is a UE, the components discussed herein are equally applicable to a WD, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343*a*. Network 343*a* may encompass wired and/or wireless networks such as a local-area network (LAN), a wide-area network (WAN), a computer network, a wireless network, a telecommunications network, another like network or any combination thereof. For example, network 343*a* may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343*b* using communication subsystem 331. Network 343*a* and network 343*b* may be the same network or networks or different network or networks. Communication subsystem 331 may be configured to include one or more transceivers used to communicate with network 343*b*. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343*b* may encompass wired and/or wireless networks such as a local-area network (LAN), a wide-area network (WAN), a computer network, a wireless network, a telecommunications network, another like network or any combination thereof. For example, network 343*b* may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
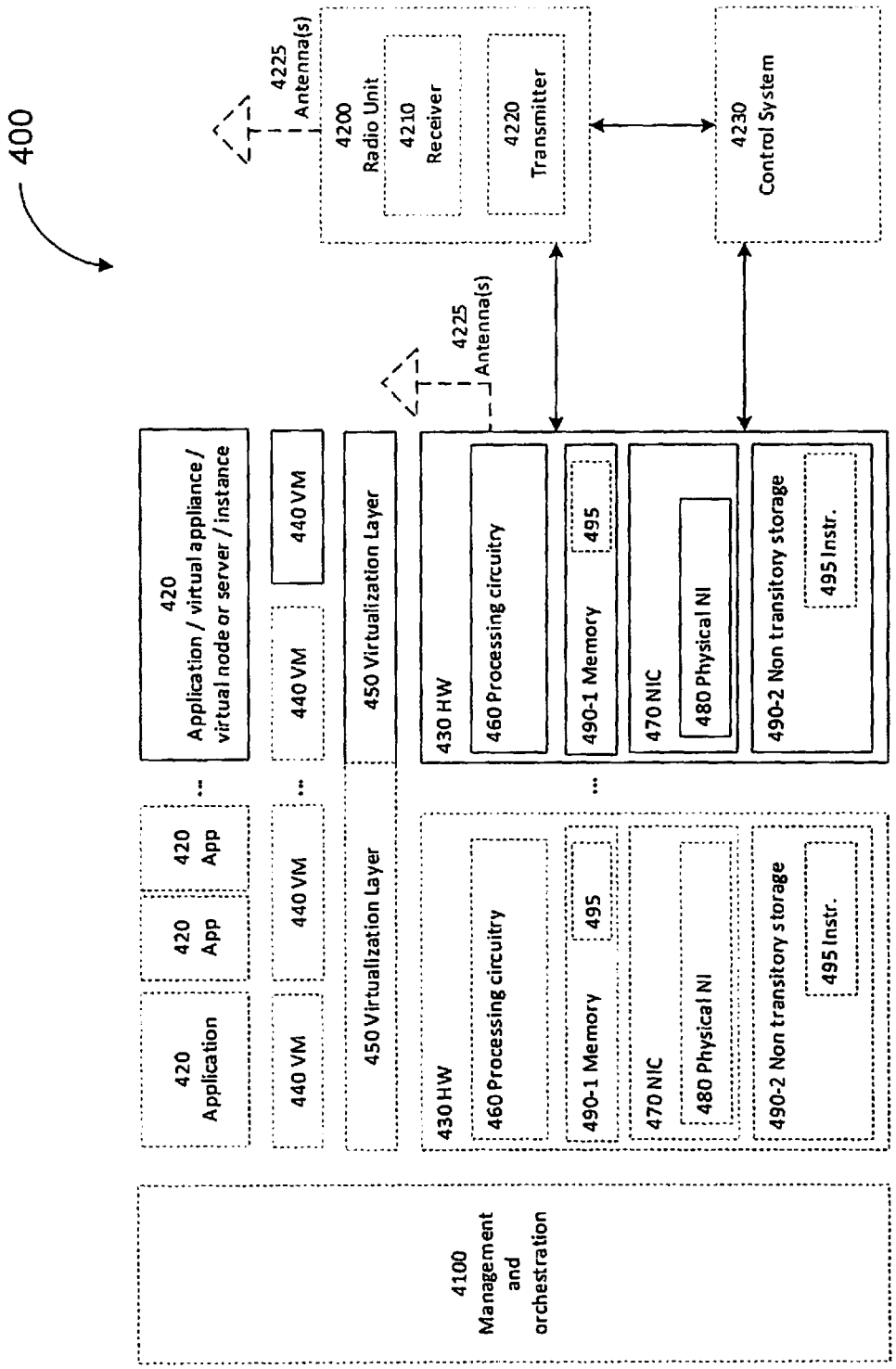
FIG. 4 illustrates an example virtualization environment, according to certain embodiments.

FIG. 4 illustrates an example virtualization environment, according to certain embodiments. FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signaling can be affected with the use of control system 4230 which may alternatively be used for communication between the hardware nodes 430 and radio units 4200.

Figure 5:
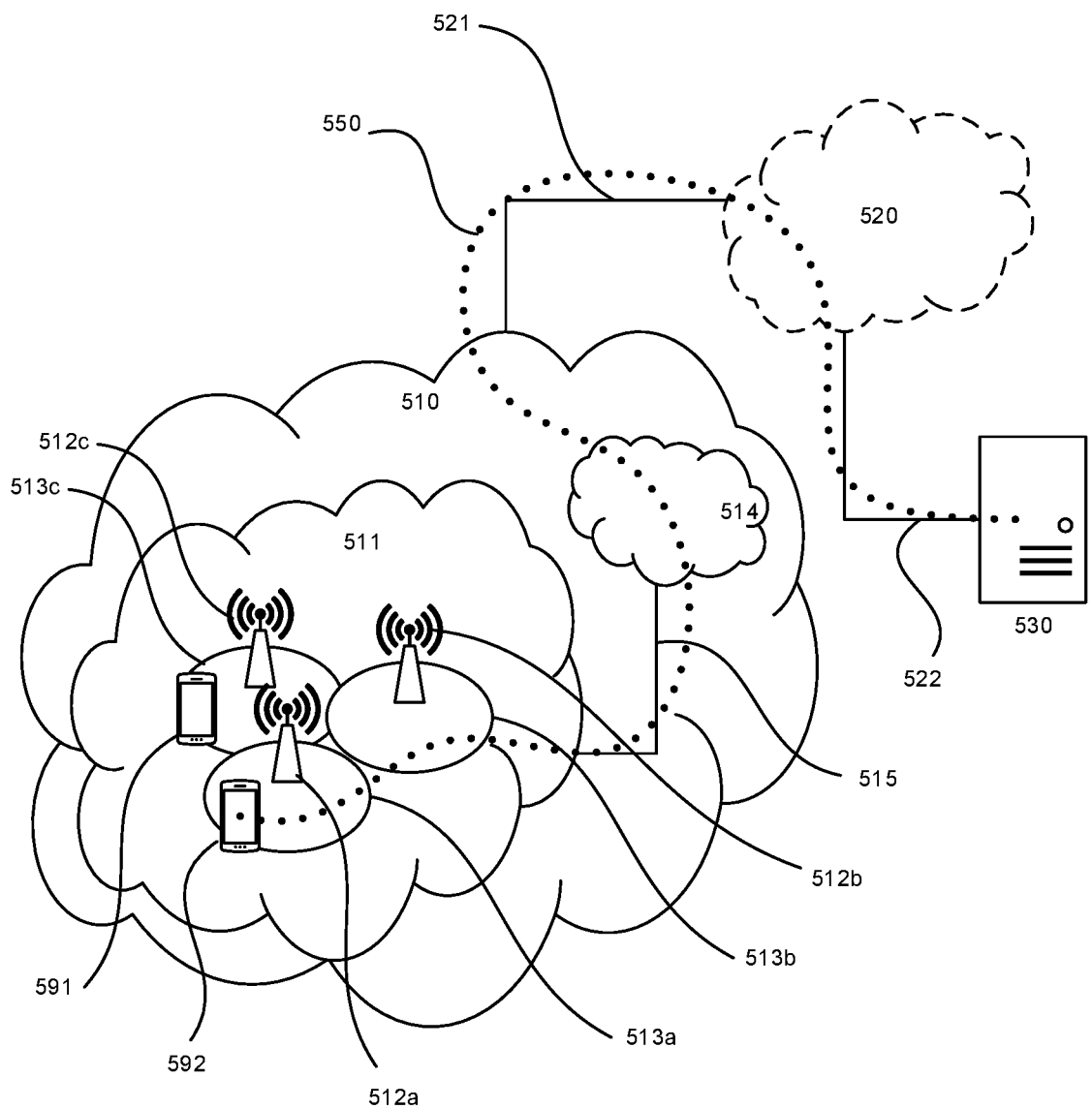
FIG. 5 illustrates an example telecommunication network connected via an intermediate network to a host computer, according to certain embodiments.

FIG. 5 illustrates an example telecommunication network connected via an intermediate network to a host computer, according to certain embodiments. With reference to FIG. 5, in accordance with an embodiment, a communication system includes telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512. In certain embodiments, the plurality of UEs 591, 592 may be the user equipment as described with respect to FIG. 14.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more sub-networks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Figure 6:
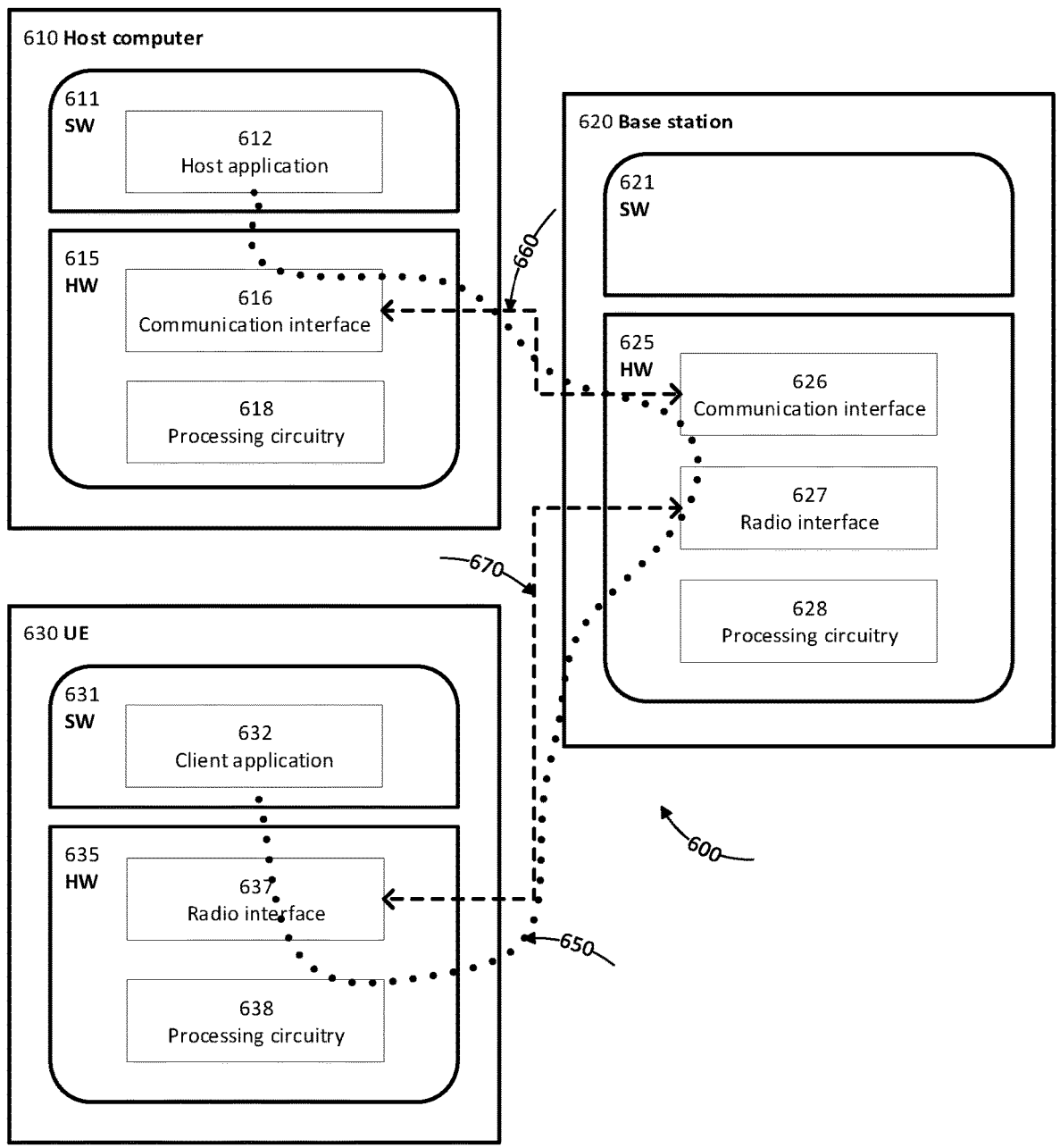
FIG. 6 illustrates an example host computer communicating via a base station with a user equipment over a partially wireless connection, according to certain embodiments.

FIG. 6 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. In certain embodiments, the base station 620 may be an apparatus as described with respect to FIG. 13. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. In certain embodiments, the UE 630 may be the user equipment as described with respect to FIG. 14. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

It is noted that host computer 610, base station 620 and UE 630 illustrated in FIG. 6 may be similar or identical to host computer 530, one of base stations 512a, 512b, 512c and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
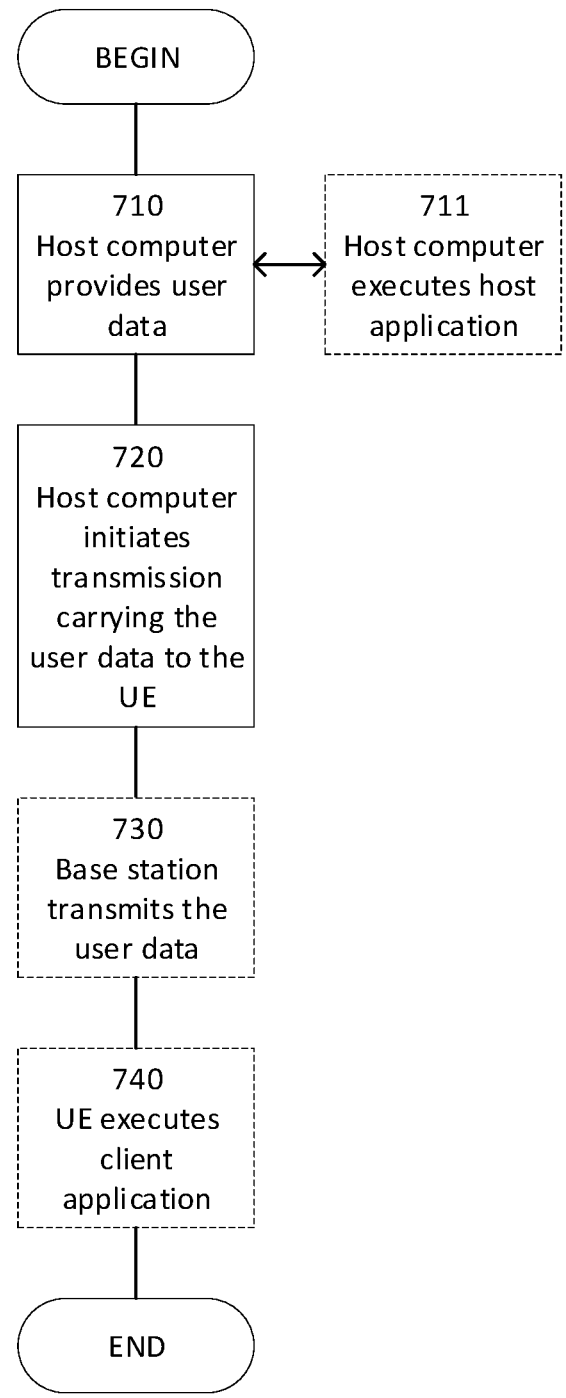
FIG. 7 illustrates an example method implemented in a communication system including a host computer, a base station and a user equipment, according to certain embodiments.

FIG. 7 illustrates an example method implemented in a communication system including a host computer, a base station and a user equipment, according to certain embodiments in accordance with some embodiments. More specifically, FIG. 7 is a flowchart illustrating a method implemented in a communication system, in accordance with one embodiment. The communication system includes a host computer, a base station and a UE which may be a user equipment described with reference to FIG. 14. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
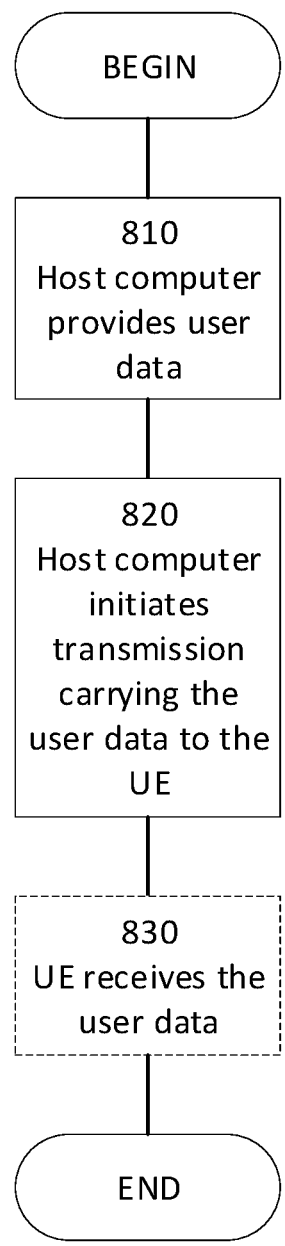
FIG. 8 illustrates another example method implemented in a communication system including a host computer, a base station and a user equipment, according to certain embodiments.

FIG. 8 illustrates an example method implemented in a communication system including a host computer, a base station and a user equipment, in accordance with some embodiments. More specifically, FIG. 8 is a flowchart illustrating a method implemented in a communication system, in accordance with one embodiment. The communication system includes a host computer, a base station and a UE which may be a user equipment described with reference to FIG. 14. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figure 9:
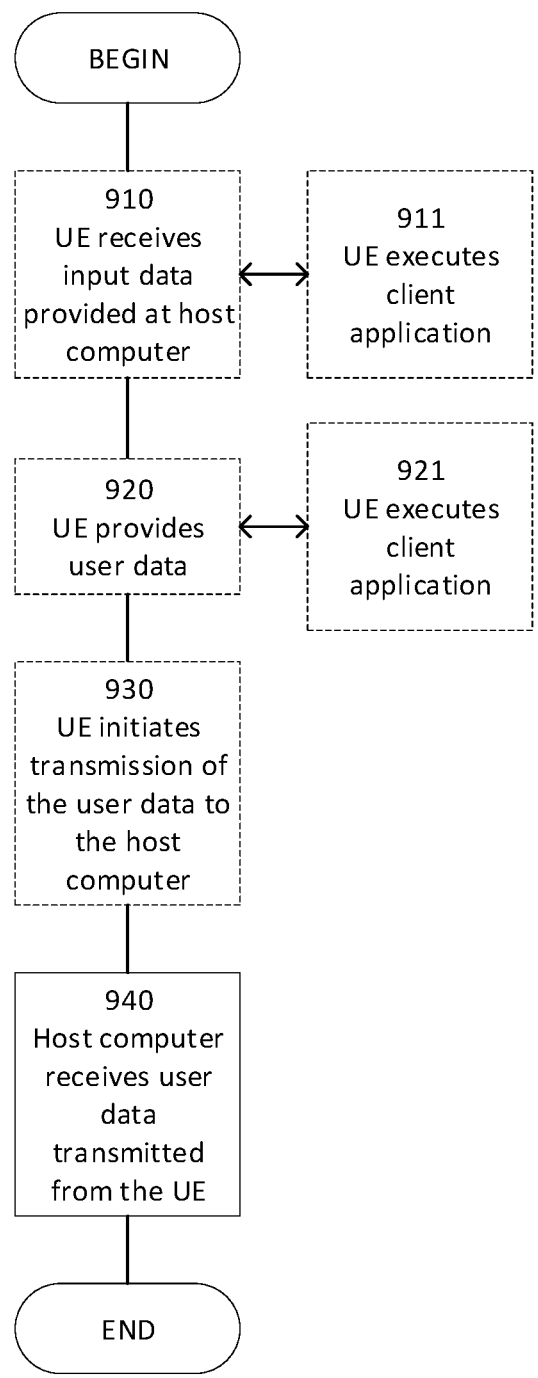
FIG. 9 illustrates another further example method implemented in a communication system including a host computer, a base station and a user equipment, according to certain embodiments.

FIG. 9 illustrates another further example method implemented in a communication system including a host computer, a base station and a user equipment, in accordance with some embodiments. More specifically, FIG. 9 is a flowchart illustrating a method implemented in a communication system, in accordance with one embodiment. The communication system includes a host computer, a base station and a UE which may be a user equipment described with reference to FIG. 14. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

Figure 10:
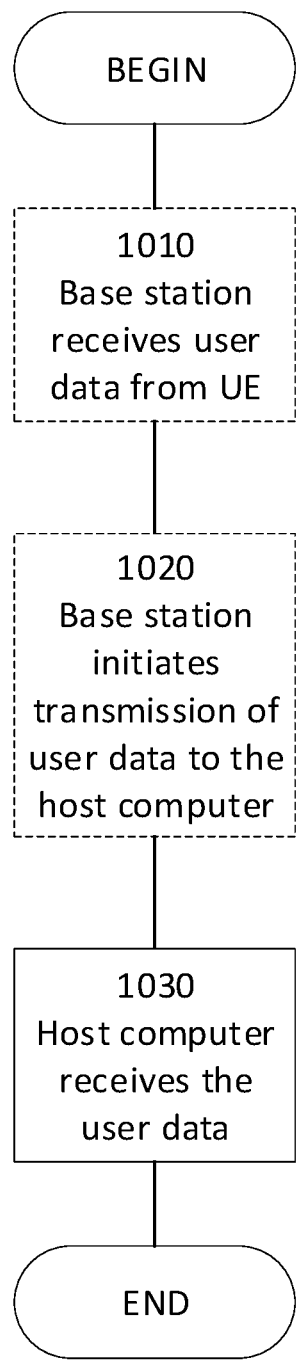
FIG. 10 illustrates another yet example method implemented in a communication system including a host computer, a base station and a user equipment, according to certain embodiments.

FIG. 10 illustrates another example method implemented in a communication system including a host computer, a base station and a user equipment, in accordance with some embodiments. More specifically, FIG. 10 is a flowchart illustrating a method implemented in a communication system, in accordance with one embodiment. The communication system includes a host computer, a base station and a UE which may be a user equipment described with reference to FIG. 14 For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 11:
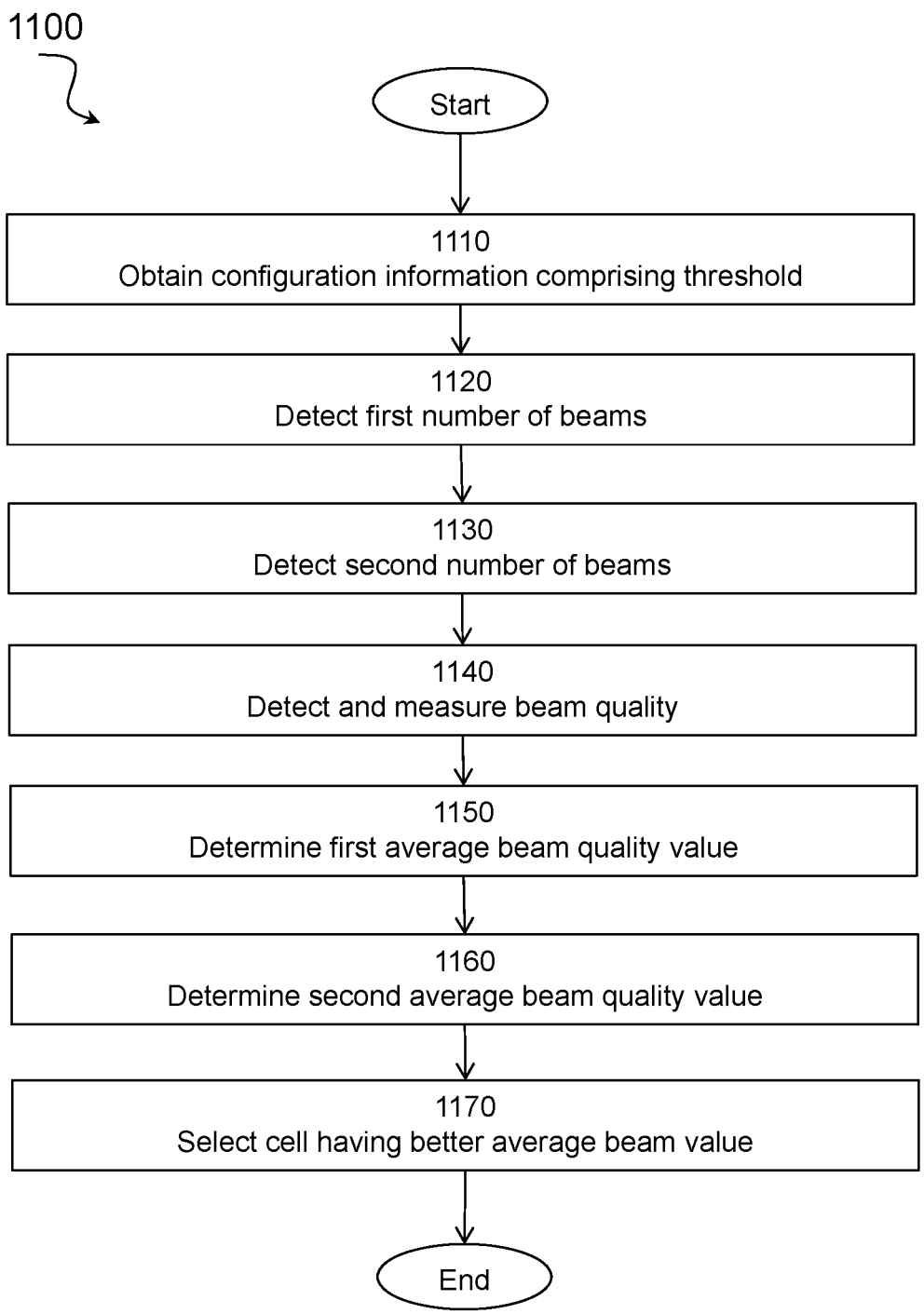
FIG. 11 illustrates a flow diagram of an example method, in accordance with certain embodiments.

FIG. 11 is a flow diagram of an example method, in accordance with certain embodiments. The method may be performed by a UE or a WD. The method begins at step 1110 with obtaining configuration information comprising a threshold. The configuration information may be obtained from a network node or may be obtained from internal storage, for example, the UE or WD may be pre-configured with all or some of the relevant configuration information or with instructions on how to calculate or determine all or some of the relevant configuration information. In some embodiments, the configuration information further comprises a maximum number, N, of beams. The maximum number, N, of beams may be the number of beams that are to be included in the averaging at the following steps 1150 and 1160.

At step 1120, a first number of beams associated with a first cell are detected or discovered. The first number of beams comprises X beams having a beam quality that exceeds the threshold, T. This may be determined at step 1140 where the beam quality associated with each of the beams is detected and/or measured.

At step 1130, a second number of beams associated with a second cell are detected or discovered. The second number of beams comprises Y beams having a beam quality that exceeds the threshold, T. This may be determined at step 1140 where the beam quality associated with each of the beams is detected and/or measured.

At step 1140, the beam quality of each of the first and second number of beams are detected and measured. For example, in some embodiments SS block associated with each beam may be detected and measured.

At step 1150, a first average beam quality value for the first cell is determined. The first average beam quality value is based on the X beams and at least one fictive beam. The fictive beam may have a quality value less than the threshold. In some embodiments, the beam quality value of the fictive beam may be determined from the threshold, T. For example, the beam quality value of the fictive beam may be K×T, where K is a fraction. The number of fictive beams will vary depending on the embodiment and scenario. For example, in some embodiments, X beams may comprise L beams less than the maximum number of beams, N. This may result in L fictive beams being used in determining the first average beam value, X plus L is up to N. In some embodiments, rather than basing the number of fictive beams on the maximum number of beams, the number of fictive beams may be based on the number of beams of the second cell. For example, if the X beams comprise L beams less than the Y beams, then the first average beam value is based on the X beams and the L fictive beams, X plus L is up to Y.

At step 1160 a second average beam quality value for the second cell is determined. The second average beam quality value is based on at least the Y beams. In some embodiments, the second average beam value is also based on at least one fictive beam. The fictive beam may have a beam quality value less than the threshold. In some embodiments, the beam quality value of the fictive beam may be determined from the threshold. For example, the beam quality value of the fictive beam may be K×T, where K is a fraction. For example, the Y beams may comprise R beams less than the maximum number, N, of beams. In this case, it may be that the second average beam value is based on the Y beams and M fictive beams, Y plus M is up to N.

At step 1170, the cell having the better average beam value is selected. The selected cell may then be used for wireless communication to and from the UE or WD.

Figure 12:
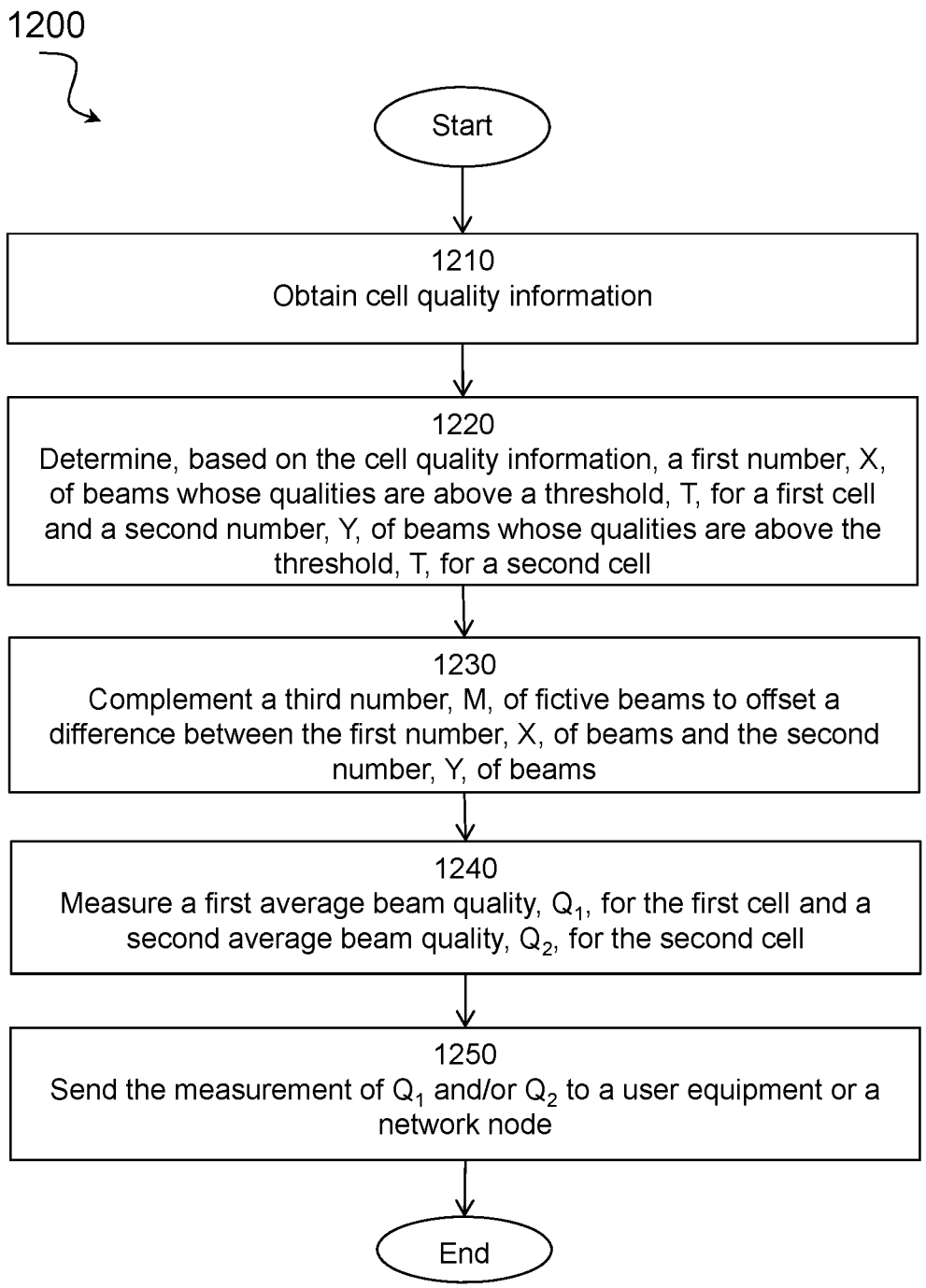
FIG. 12 illustrates a flow diagram of another example method, in accordance with certain embodiments.

FIG. 12 is a flow diagram of another example method, in accordance with certain embodiments. Method 1200 begins at step 1210 with obtaining cell quality information. The cell quality information may be obtained by measuring SS Blocks on the first cell and the second cell respectively. In some embodiments, the method 1200 may further obtain configuration information which includes a maximum number, N, of beams for the first cell and the second cell and a fictive parameter, K. In some embodiments, the method 1200 may be performed at the UE or the network node. The user equipment may be the wireless device depicted in FIG. 2 or the user equipment shown in FIG. 3, and the network node may be the network node shown in FIG. 2 or the base station shown in FIGS. 5 and 6.

At step 1220, the method 1200 determines, based on the cell quality information, a first number, X, of beams whose qualities are above a threshold, T, for a first cell and a second number, Y, of beams whose qualities are above the threshold, T, for a second cell. In some embodiments, the method further determines a maximum number, N, of beams for the first cell and the second cell based on the configuration information. In some embodiments, either one of X and Y may equal the maximum number, N. In some embodiments, none of X and Y may equal the maximum number, N.

At step 1230, the method 1200 further complements a third number, M, of fictive beams to offset a difference between the first number, X, of beams and the second number, Y, of beams. In some embodiments, when one of X and Y may equal the maximum number, N, the third number, M, will be added to the cell with fewer good beams to make the total number of beams in calculation N. For example, when Y equals N, X plus M equals N. In some embodiments, when none of X and Y equals the maximum number, N, the third number, M will be added to the cell with fewer good beams to make the total number of beams in calculation X or Y depending which one is smaller. For example, when N>Y>X, X plus M equals Y.

At step 1240, the method 1200 further measures a first average beam quality, $Q_1$, for the first cell and a second average beam quality, $Q_2$, for the second cell. In some embodiments, the first average beam quality, $Q_1$, may be determined by averaging the beam quality value of X beams and the fictive beam quality value, $P_F$, of M fictive beams, and the second beam quality, $Q_2$, may be determined by averaging the beam quality value of Y beams, when Y is bigger than X. There are multiple ways to assign a fictive beam quality value for each fictive beam based on any combination of a fictive parameter, K, the threshold, T, and a best beam quality, $P_{Best}$, from the first cell when Y is greater than X. In some embodiments, $P_F = K \times T$, where $0 < K \leq 1$. In some embodiments, $P_F = K \times P_{Best}$, where $0 < K < 1$. In some embodiments, $P_F = T + (P_{Best} - T) \times K$, where $0 < K < 1$, and $P_{Best}$ represents the best beam quality value from either the first cell or the second cell. In some embodiments, when the first cell has one beam whose quality is above the threshold, T, and the second cell has Y beams whose qualities are between $P_{Best}$ and T, $P_F = T$, $Q_1 = (P_{Best} + M \times T)/(1+M)$ and $Q_2 = Y\{T + (P_{Best} - T)/2\}/Y$, when the first cell has one beam whose quality is above the threshold, T, and the second cell has Y beams whose qualities are between $P_{Best}$ and T.

At step 1250, the method 1200 may further comprise sending the measurement of the first average beam quality, $Q_1$, for the first cell and the second average beam quality, $Q_2$, for the second cell, to a UE or to a network node. In some embodiments, the UE may use the measurement of the first average beam quality, $Q_1$, for the first cell and the second average beam quality, $Q_2$, for the second cell for a cell re-selection evaluation or a handover target evaluation.

Figure 13:
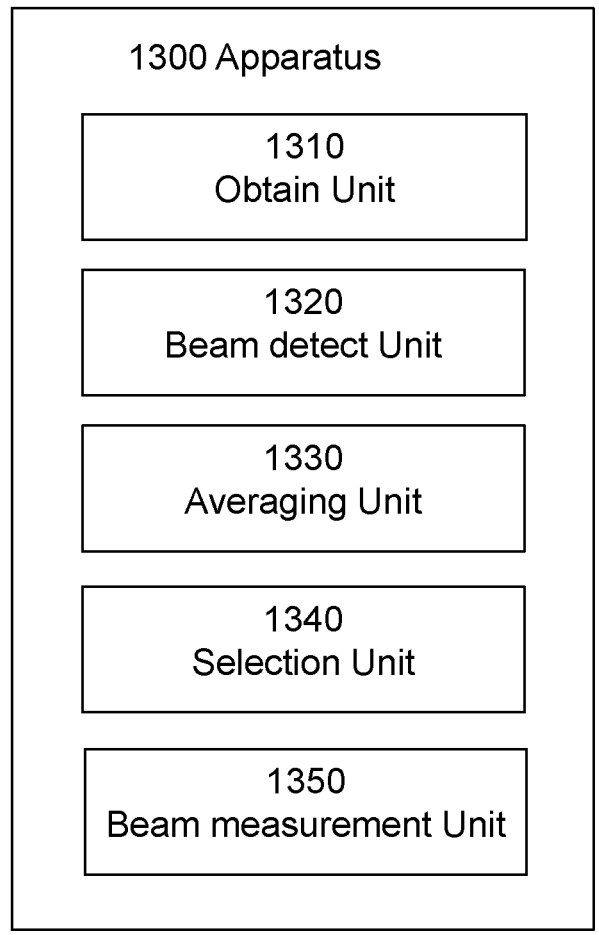
FIG. 13 illustrates a block schematic of an example virtual apparatus, in accordance with certain embodiments.

FIG. 13 is a schematic block diagram of an exemplary apparatus 1300 in a wireless network, in accordance with certain embodiments. In some embodiments, the wireless network may be the wireless network 206 shown in FIG. 2. The apparatus may be implemented in a wireless device or network node (e.g., wireless device 210 or network node 260 shown in FIG. 2). Apparatus 1300 is operable to carry out the example methods described with reference to FIGS. 11 and 12 and possibly any other processes or methods disclosed herein. It is also to be understood that the methods described in FIGS. 11 and 12 are not necessarily carried out solely by apparatus 1300. At least some operations of the method can be performed by one or more other entities.

Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtain unit 1310, beam detect unit 1320, average unit 1330, selection unit 1340, beam measurement unit 1350, and any other suitable units of apparatus 1300 to perform corresponding functions according one or more embodiments of the present disclosure.

As illustrated in FIG. 13, apparatus 1300 includes obtain unit 1310, beam detect unit 1320, average unit 1330, selection unit 1340, and beam measurement unit 1350. Obtain unit 1310, is configured to obtain configuration information that includes at least a threshold. The configuration information may be obtained from a network node or may be obtained from internal storage. For example, the UE or WD may be pre-configured with all or some of the relevant configuration information or with instructions on how to calculate or determine all or some of the relevant configuration information. In some embodiments, the configuration information further comprises a maximum number of beams. The maximum number of beams may be the number of beams that are to be included in the averaging by averaging unit 1330.

Beam detect unit 1320 is configured to detect a first number of beams associated with a first cell. The first number of beams comprises X beams having a beam quality that exceeds the threshold. Beam detect unit 1320 is also configured to detect a second number of beams associated with a second cell. The second number of beams comprises Y beams having a beam quality that exceeds the threshold. The number of beams above the threshold may be determined by beam measurement unit 1350.

Averaging unit 1330 is configured to determine a first average beam quality value for the first cell. The first average beam quality value is based on the X beams and at least one fictive beam. The fictive beam may have a beam quality value less than the threshold. In some embodiments, the beam quality value of the fictive beam may be determined from the threshold, for example, the beam quality value of the fictive beam may equal K×threshold, where K is a fraction. The number of fictive beams will vary depending on the embodiment and scenario. For example, in some embodiments, X beams may comprise L beams less than the maximum number of beams. This may result in L fictive beams being used in determining the first average beam value. In some embodiments, rather than basing the number of fictive beams on the maximum number of beams, the number of fictive beams may be based on the number of beams of the second cell. For example, if the X beams comprise L beams less than the Y beams, then the first average beam value is based on the X beams and the L fictive beams, X plus L is up to Y. Averaging unit 1330 is also configured to determine a second average beam value for the second cell. The second average beam quality value is based on at least the Y beams. In some embodiments, the second average beam quality value is also based on at least one fictive beam. The fictive beam may have a beam quality value less than the threshold. In some embodiments, the beam quality value of the fictive beam may be determined from the threshold, for example, the beam quality value of the fictive beam may equal K×threshold, where K is a fraction. For example, the Y beams may comprise R beams less than the maximum number of beams. In this case, it may be that the second average beam quality value is based on the Y beams and R fictive beams.

Selection unit 1340 is configured to select the cell having the better average beam quality value. The selected cell may then be used for wireless communication to and from the UE or WD.

Beam measurement unit 1350 is configured to detect and measure the beam quality value of each of the first and second number of beams. For example, in some embodiments SS block associated with each beam may be detected and measured.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 14:
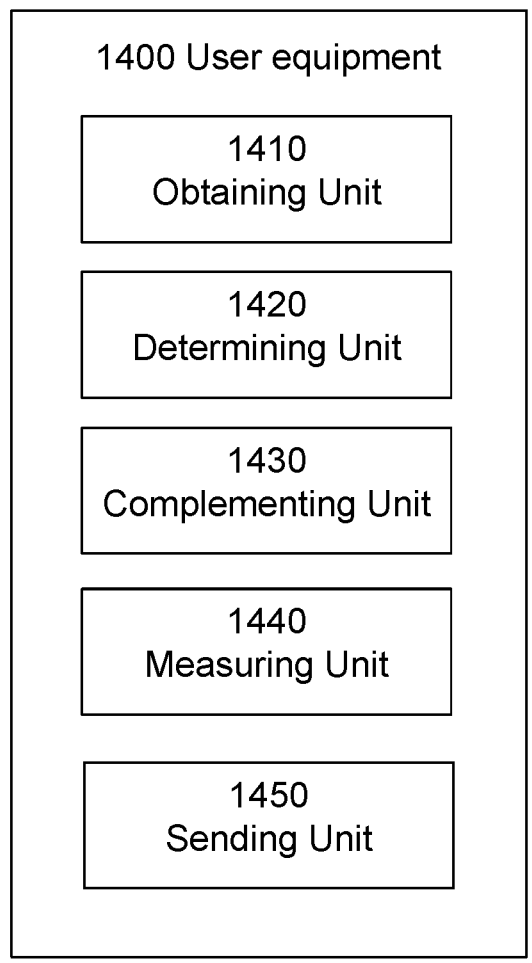
FIG. 14 illustrates a block schematic of an example user equipment, in accordance with certain embodiments.

FIG. 14 is a schematic block diagram of an exemplary user equipment, in accordance with certain embodiments. The user equipment 1400 may be used in a wireless network (for example, the wireless network 206 shown in FIG. 2). The user equipment 1300 may be implemented in a wireless device 210 shown in FIG. 2. User equipment 1400 is operable to carry out the example methods described with reference to FIGS. 11 and 12 and possibly any other processes or methods disclosed herein. It is also to be understood that the methods in FIGS. 11 and 12 are not necessarily carried out solely by user equipment 1300. At least some operations of the method can be performed by one or more other entities.

User equipment 1400 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1300 may be the processing circuitry 220 shown in FIG. 2. In some embodiments, the processing circuitry of user equipment 1100 may be the processor 301 shown in FIG. 3. The processing circuitry may be configured to execute program code stored in memory 315 shown in FIG. 3, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1410, determining unit 1420, complementing unit 1430, measuring unit 1440, and sending unit 1450, and any other suitable units of user equipment 1400 to perform corresponding functions according one or more embodiments of the present disclosure, such as a transmitter and a receiver.

As illustrated in FIG. 14, user equipment 1400 includes obtaining unit 1410, determining unit 1420, complementing unit 1430, measuring unit 1440, and sending unit 1450. The obtaining unit 1410 may be configured to obtain cell quality information. In some embodiments, the obtaining unit 1420 may be configured to obtain the cell quality information from measuring SS Blocks on each cell. In some embodiments, the obtaining unit 1400 may further obtain configuration information which includes a maximum number, N, of beams for the first cell and the second cell and a fictive parameter, K.

The determining unit 1420 may be configured to determine, based on the cell quality information, a first number, X, of beams whose qualities are above a threshold, T, for a first cell and a second number, Y, of beams whose qualities are above the threshold, T, for a second cell. In some embodiments, the determining unit 1420 further determines a maximum number, N, of beams for the first cell and the second cell based on the configuration information. In some embodiments, either one of X and Y may equal the maximum number, N. In some embodiments, none of X and Y may equal the maximum number, N.

The complementing unit 1430 may be configured to complement a third number, M, of fictive beams to offset a difference between the first number, X, of beams and the second number, Y, of beams. In some embodiments, when one of X and Y may equal the maximum number, N, the third number, M, will be added to the cell with fewer good beams to make the total number of beams in calculation N. For example, when Y equals N, X plus M equals N. In some embodiments, when none of X and Y equals the maximum number, N, the third number, M will be added to the cell with fewer good beams to make the total number of beams in calculation X or Y depending which one is smaller. For example, when N>Y>X, X plus M equals Y.

The measuring unit 1440 may be configured to measure a first average beam quality, $Q_1$, for the first cell and a second average beam quality, $Q_2$, for the second cell. In some embodiments, the first average beam quality, $Q_1$, may be determined by averaging the beam quality value of X beams and the fictive beam quality value, $P_F$, of M fictive beams, and the second beam quality, $Q_2$, may be determined by averaging the beam quality value of Y beams, when Y is bigger than X. There are multiple ways to assign a fictive beam quality value for each fictive beam based on any combination of a fictive parameter, K, the threshold, T, and a best beam quality, $P_{Best}$, from the first cell when Y is greater than X. In some embodiments, $P_F=K\times T$, where $0<K\leq 1$. In some embodiments, $P_F=K\times P_{Best}$, where $0<K<1$. In some embodiments, $P_F=T+(P_{Best}-T)\times K$, where $0<K<1$, and $P_{Best}$ represents the best beam quality value from either the first cell or the second cell. In some embodiments, when the first cell has one beam whose quality is above the threshold, T, and the second cell has Y beams whose qualities are between $P_{Best}$ and T, $P_F=T$, $Q_1=(P_{Best}+M\times T)/(1+M)$ and $Q_2=Y\{T+(P_{Best}-T)/2\}/Y$, when the first cell has one beam whose quality is above the threshold, T, and the second cell has Y beams whose qualities are between $P_{Best}$ and T.

The sending unit 1450 may be configured to send the measurement of the first average beam quality, $Q_1$, for the first cell and the second average beam quality, $Q_2$, for the second cell to a network node.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that providing a fair evaluation of cell quality between potential cells so that a UE or a network node which receives or obtains the evaluation may perform a better communication with the target cell.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for evaluating cell quality comprising:
obtaining cell quality information;
determining, based on the cell quality information, a first number, X, of beams whose qualities are above a threshold, T, for a first cell and a second number, Y, of beams whose qualities are above the threshold, T, for a second cell;
complementing a third number, M, of fictive beams to offset a difference between the first number, X, of beams and the second number, Y, of beams wherein the M fictive beams have a quality based at least in part on the threshold T; and
determining a first average beam quality, $Q_1$, for the first cell and a second average beam quality, $Q_2$, for the second cell.

2. The method according to claim 1, further comprising obtaining configuration information which includes a maximum number, N, of beams for the first cell and the second cell and a fictive parameter, K, associated with quality.

3. The method according to claim 2, wherein the third number, M, complements the first number, X, to the maximum number, N, when the second number, Y, equals the maximum number, N.

4. The method according to claim 2, wherein the third number, M, complements the first number, X, to the second number, Y, when the maximum number, N, is greater than the first number, X, and the maximum number, N, is greater than the second number, Y, and the second number, Y, is greater than the first number, X.

5. The method according to claim 1, wherein each fictive beam has a third beam quality, $P_F$, which is defined based on any combination of a fictive parameter, K, associated with quality, the threshold, T, and a best beam quality, $P_{Best}$, from the first cell when Y is greater than X.

6. The method according to claim 5, wherein $P_F=T$, $Q_1=(P_{Best}+M\times T)/(1+M)$ and $Q_2=Y\{T+(P_{Best}-T)/2\}/Y$, when the first cell has one beam whose quality is above the threshold, T, and the second cell has Y beams whose qualities are between $P_{Best}$ and T.

7. The method according to claim 1, wherein the method is performed at a user equipment (UE) and further comprises sending, to a network node, the measurement of the first average beam quality, $Q_1$, for the first cell and the second average beam quality, $Q_2$, for the second cell.

8. The method according to claim 1, wherein the method is performed at the network node and further comprises sending, to the UE, the measurement of the first average beam quality, $Q_1$, for the first cell and the second average beam quality, $Q_2$, for the second cell.

9. The method according to claim 1, wherein the measurement of the first average beam quality, $Q_1$, for the first cell and the second average beam quality, $Q_2$, for the second cell is used for a cell re-selection evaluation or a handover target evaluation.

10. A method for evaluating cell quality comprising:
obtaining cell quality information and a maximum number, N, of beams for a cell;
determining, based on the cell quality information, a first number, X, of beams whose qualities are above a threshold, T, for the cell;
complementing a second number, M, of fictive beams to offset a difference between the first number, X, of beams and the maximum number, N, of beams for the cell wherein the M fictive beams have a quality based at least in part on the threshold T; and
determining an average beam quality, Q, for the cell.

11. The method according to claim 10, further comprising obtaining configuration information which includes a fictive parameter, K, associated with quality.

12. The method according to claim 11, wherein each fictive beam has a fictive beam quality, $P_F$, which is defined based on any combination of the fictive parameter, K, the threshold, T, and a best beam quality, $P_{Best}$, from the cell.

13. The method according to claim 12, wherein $P_F=T$, $Q=(P_{Best}+M\times T)/(1+M)$, when the cell has one beam whose quality is above the threshold, T.

14. A user equipment for resuming a connection, comprising:
at least one processing circuitry; and
at least one storage that stores processor-executable instructions, when executed by the processing circuitry, causes the user equipment to:
obtain cell quality information;
determine, based on the cell quality information, a first number, X, of beams whose qualities are above a threshold, T, for a first cell and a second number, Y, of beams whose qualities are above the threshold, T, for a second cell;
complement a third number, M, of fictive beams to offset a difference between the first number of beams and the second number of beams wherein the M fictive beams have a quality based at least in part on the threshold T; and
determine a first average beam quality, $Q_1$, for the first cell and a second average beam quality, $Q_2$, for the second cell.

15. The user equipment according to claim 14, wherein the instructions further cause the user equipment to obtain configuration information which includes a maximum number, N, of beams for the first cell and the second cell and a fictive parameter, K, associated with quality.

16. The user equipment according to claim 14, wherein the third number, M, complements the first number, X, to the maximum number, N, when the second number, Y, equals the maximum number, N.

17. The user equipment according to claim 14, wherein the third number, M, complements the first number, X, to the second number, Y, when the maximum number, N, is greater than the first number, X, and the maximum number, N, is greater than the second number, Y, and the second number, Y, is greater than the first number, X.

18. The user equipment according to claim 14, wherein each fictive beam has a third beam quality, $P_F$, which is defined based on any combination of a fictive parameter, K, associated with quality, the threshold, T, and a best beam quality, $P_{Best}$, from the first cell when Y is greater than X.

19. The user equipment according to claim 18, wherein $P_F=T$, $Q_1=(P_{Best}M\times T)/(1+M)$ and $Q_2=Y\{T+(P_{Best}-T)/2\}/Y$, when the first cell has one beam whose quality is above the threshold, T, and the second cell has Y beams whose qualities are between $P_{Best}$ and T.

20. The user equipment according to claim 14, wherein the instructions further cause the user equipment to send, to a network node, the measurement of the first average beam quality, $Q_1$, for the first cell and the second average beam quality, $Q_2$, for the second cell.

21. The user equipment according to claim 14, wherein the user equipment uses the measurement of the first average beam quality, $Q_1$, for the first cell and the second average beam quality, $Q_2$, for the second cell to perform a cell re-selection or a handover.

22. A user equipment for resuming a connection, comprising:
   at least one processing circuitry; and
   at least one storage that stores processor-executable instructions, when executed by the processing circuitry, causes the user equipment to:
   obtain cell quality information and a maximum number, N, of beams for a cell;
   determine, based on the cell quality information, a first number, X, of beams whose qualities are above a threshold, T, for the cell;
   complement a second number, M, of fictive beams to offset a difference between the first number, X, of beams and the maximum number, N, of beams for the cell wherein the M fictive beams have a quality based at least in part on the threshold T; and
   determine an average beam quality, Q, for the cell.

23. The user equipment according to claim 22, wherein the instructions further cause the user equipment to obtain configuration information which includes a fictive parameter, K, associated with quality.

24. The user equipment according to claim 23, wherein each fictive beam has a fictive beam quality, $P_F$, which is defined based on any combination of the fictive parameter, K, the threshold, T, and a best beam quality, $P_{Best}$, from the cell.

25. The user equipment according to claim 24, wherein $P_F = T$, $Q = (P_{Best} + M \times T)/(1+M)$, when the cell has one beam whose quality is above the threshold, T.

26. A communication system for resuming a connection comprising a user equipment and a network node:
   the user equipment comprising at least one processing circuitry configured to:
   obtain cell quality information;
   determine, based on the cell quality information, a first number, X, of beams whose qualities are above a threshold, T, for a first cell and a second number, Y, of beams whose qualities are above the threshold, T, for a second cell;
   complement a third number, M, of fictive beams to offset a difference between the first number of beams and the second number of beams wherein the M fictive beams have a quality based at least in part on the threshold T;
   determine a first average beam quality, $Q_1$, for the first cell and a second average beam quality, $Q_2$, for the second cell; and
   send, to the network node, the measurement of the first average beam quality, $Q_1$, for the first cell and the second average beam quality, $Q_2$, for the second cell.

* * * * *